Jan. 18, 1955 A. E. BACHELET 2,700,146

PULSE COUNTING AND REGISTERING SYSTEM

Filed Jan. 31, 1952 2 Sheets-Sheet 1

INVENTOR
A. E. BACHELET
BY J. W. Schmied
ATTORNEY

INVENTOR
A. E. BACHELET
BY J. W. Schmied
ATTORNEY 2,700,146

Patented Jan. 18, 1955

2,700,146

PULSE COUNTING AND REGISTERING SYSTEM

Albert E. Bacheiet, New York, N. Y., assignor to Bell Telephone Laboratories, Incorporated, New York, N. Y., a corporation of New York Application January 31, 1952, Serial No. 269,251

9 Claims. (Cl. 340—147)

This invention relates generally to signaling systems and more particularly to arrangements of such systems for detecting and counting signal impulses. The invention has for its main object the improvement of gas tube counting and registering circuits.

Another object of the invention is to increase the speed of operation of an impulse counting and registering arrangement suitable for use in a telephone dialing circuit.

Another object of the invention is to use gaseous discharge devices having a plurality of conductive positions in an impulse counting and registering system so as to eliminate the many relays or tubes that have been required in the prior art.

A feature of the invention is the utilization of cold cathode gaseous discharge stepping devices that have a plurality of cathodes.

Another feature of the invention is the use of multicathode gaseous discharge devices for successively counting the groups of pulses that represent the digits of a designated telephone number.

Another feature of the invention is a means for momentarily associating the pulse detecting means with the successive gaseous discharge devices which act as pulse counters and digit registers.

Figure 1:
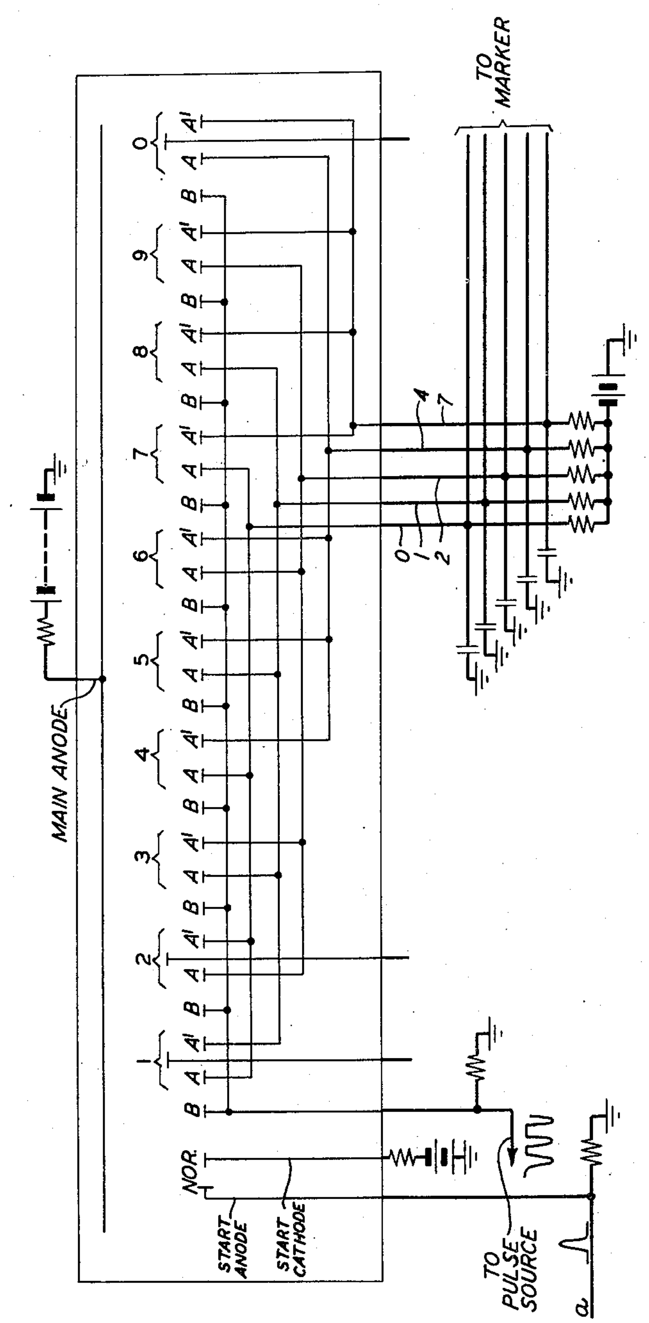
Figure 2:
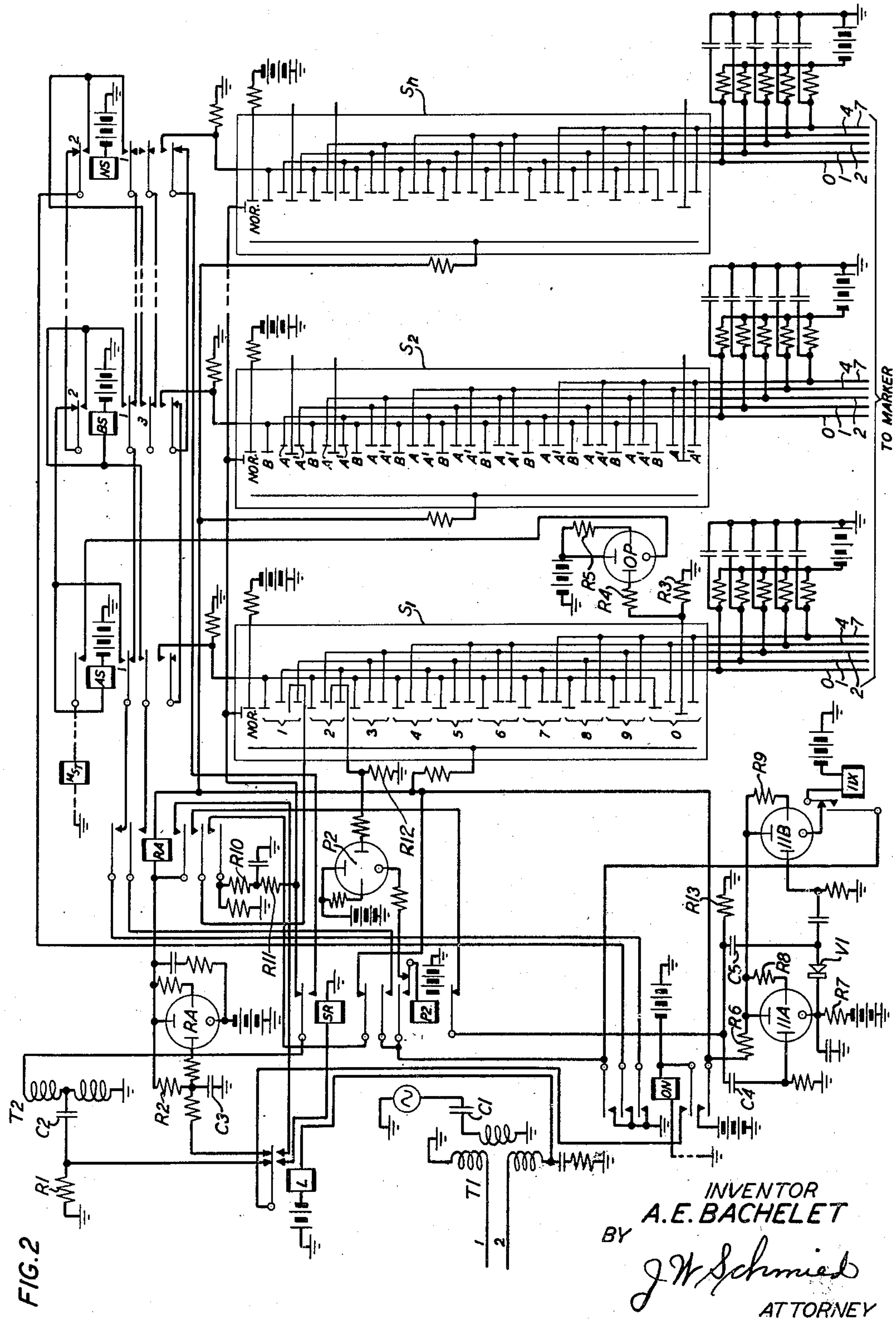

A preferred embodiment of the invention is shown in the accompanying drawing in which:

Fig. 1 is a simplified circuit of a multiconductive position gaseous counting tube and is used merely to illustrate the basic principles of operation of the tube; and Fig. 2 is a circuit diagram of a preferred exemplary embodiment of the invention.

The present day signaling systems, such as may be used in automatic telephone systems, continuous effort is being made to increase the speed of circuits responsive to dial signals. In the telephone field in particular, continuous effort is exercised towards developing circuits which will respond accurately at a more rapid rate to signals such as dial pulses or the like.

The present invention is herein disclosed as embodied in an automatic telephone system such as is disclosed in the copending application of A. J. Busch, Serial No. 57,394, filed October 29, 1948, and now Patent No. 2,585,904, issued February 19, 1952. Busch discloses in detail a cross bar system wherein originating register circuits are used for transmitting dial tone to coin subscribers, for counting the pulses of called digits, for registering the called digits, and for seizing an idle marker circuit for the purpose of having such a marker complete the desired connection. Since the present invention relates solely to pulse counting and registering circuits, only these portions of an originating register have been disclosed and described herein. A copending application by J. W. Dehn, Serial No. 57,398, filed October 29, 1948, and now Patent No. 2,616,974, issued November 4, 1952, discloses a skeletonized arrangement of the Busch disclosure including an originating register circuit in some detail. The Dehn and Busch disclosures may be referred to for details, if any, omitted from the present description that may be needed for the incorporation of the present invention into a more complete system.

This invention is not necessarily so limited in its utility that it must be used as part of an originating register. It can be applied in any circuit wherein the rapid detection, counting, and registering of pulses are required.

The function of an originating register in the cross bar system disclosed by Busch and Dehn is to receive, detect, count, and register dial pulses transmitted thereto by the dialing action of a calling subscriber. It is the improvement of counting systems with which the present invention, in one of its forms, finds utility by improving the speed of response of originating registers.

As may be obtained from the Busch and Dehn disclosures, the general sequence of events during the origination of a call by a subscriber is as follows:

(1) The calling subscriber lifts his receiver, thereby seizing an idle marker circuit and automatically informing the seized marker that a dial tone connection is desired.

(2) The seized marker tests for and seizes an idle originating register circuit.

(3) The marker interconnects the calling line with the seized originating register circuit over the cross bar switch train and then the marker releases.

(4) The originating register transmits dial tone to the calling subscriber.

(5) The calling subscriber dials the digits of the called number.

(6) The originating register receives, follows, and counts pulses of each digit, and then registers such digits.

(7) When sufficient digits have been registered therein, the originating register seizes an idle marker circuit and transfers thereto, among other items of information pertaining to a call, the digits so registered.

(8) The marker, when it has received all of the information from the originating register, releases the originating register, completes the call, and releases itself.

Since the present invention is embodied only in the circuits of an originating register, so far as the present disclosure in concerned, the subsequent description will cover only items 4, 5, and 6 above. The other items are fully disclosed bv the Busch and Dehn applications which are incorporated herein by reference.

*Stepping tubes*

Since the stepping tube used in this invention is relatively new in the art, a brief description of its mode of operation may be considered appropriate. This tube is of the same general type as shown in the applications by H. L. Von Gugelberg, Serial No. 141,123, filed January 28, 1950, now Patent No. 2,646,523, issued July 21, 1953, and by M. A. Townsend, Serial No. 109,337, filed August 9, 1949, now Patent No. 2,575,371, issued November 20, 1951.

These applications are cited merely to acquaint one more fully with the theory and mode of operation of such tubes. The present invention is not to be considered dependent upon the Von Gugelberg or Townsend disclosure.

A circuit illustrating the basic principles of operation of the multiconductive position counting tube is shown in Fig. 1 of the drawings. With reference to this circuit it may be observed that the tube has a neutral position designated NOR, and zero other positions which permit the counting of any digit from one to ten. The tube is provided with a main anode, two A cathodes in each of the ten counting positions designated "A and A'," and an additional cathode in positions 1, 2, and 0 for performing service functions to be explained hereinafter. Interposed between each double set of cathodes as well as the NOR electrodes are stepping cathodes B, all of which are connected together. The purpose of the B cathodes is to transfer the discharge from a preceding to a succeeding conductive position for each pulse received. The twenty A cathodes in the ten counting positions are strapped together internally to provide a two-out-of-five code indicative of the digit expressed by each position.

When the circuit is energized a positive pulse is applied to the start anode, ionizing the tube in the NOR position. When the positive pulse is applied to the start anode over lead *a*, conduction takes place between the start anode and the start cathode. When the pulse is removed from the start anode its potential drops and the conduction transfers to the main anode and the start cathode. The potential difference between the main anode and the start cathode is sufficient to maintain a discharge but is insufficient to initiate one. The same relationship exists between the main anode and the A cathodes.

In order to step the tube it is necessary to apply negative pulses to the lead connecting the B cathodes. In order for the B cathodes at the No. 1 position to seize the discharge from the NOR position, the amplitude of the negative pulses applied to the B cathode must be greater than the negative potential applied to the start cathode.

When the negative pulses are applied to the B cathodes they will become highly negative, and the potential difference between the main anode and the B cathode at the first position will become much greater than the potential difference between the main anode and the start cathode. As a result, the discharge path will move to the B cathode of the first position. When the negative pulse terminates, the potential difference between the main anode and the B cathode will fall and the discharge will move from the B cathode to the two A cathodes of the first position. The A cathodes will sustain the discharge by means of their respective load resistors each of which is connected to a source of negative potential. When another negative pulse is applied to the B cathodes, a similar action takes place, stepping the discharge from position 1 to position 2. In this manner the count progresses until the digit is fully counted. The tendency of the discharge to move in one direction rather than in the other is governed by the geometry of the tube and by the fact that the ionization density on the A cathodes is greater in the forward direction than in the backward direction.

At the end of each digit or series of pulses, the discharge will be located in the position that represents the number of impulses constituting the digit. For example, if there were eight pulses in the digit counted, the discharge would be at position 8 of the counting tube and conduction would then be taking place over the cathode leads designated 7 and 1. The current flowing through the cathode resistors in leads 1 and 7 will cause potential of these two cathodes to rise to a more positive potential, or fall to a less negative potential, thereby discharging the condenser associated with each line. Connections run from the cathode leads to a translator circuit, not shown on Fig. 1, which, at the termination of counting, translates the difference in potential of the two-out-of-five cathode leads into the appropriate numerical representation. This numerical representation is then utilized in other circuits, not shown, to further the progress of the telephone call.

When it is desired to reset the tube to its normal position a positive pulse of large amplitude is applied to the *a* lead and the start anode. The potential difference between the start anode and the start cathode becomes great enough to seize the discharge from whatever counting position it may have been in and return it to the NOR position. The tube is now again in a position to receive impulses over the B cathode line for the purpose of counting and registering additional numbers.

The additional cathodes at counting positions 1, 2 and 0 are for service functions to be described hereinafter.

*Stepping tube used as a digit register*

The use of a stepping tube as a combination dial counter and digit register is shown on Fig. 2 of the drawing. This circuit utilizes a line relay designated L to detect and repeat the dial pulses, an RA tube and RA relay to measure the interdigital time, a P2 tube and P2 relay to check that the tube has stepped beyond a designated position, a zero operator circuit comprising a tube OP, and an 11X circuit.

An exemplary embodiment of the invention as used in an originating register is shown on Fig. 2 of the drawing. In this embodiment the line relay detects the pulses of each digit and with the aid of a plurality of steering relays, successively guides the pulses of each digit into appropriate digit register tubes. The steering relays control the pulsing paths so that each tube counts and stores the pulses of a different digit. At the termination of dialing the digits stored in each tube are transferred to a marker which then undertakes such further action as may be necessary to complete the call.

When the marker seizes an idle originating register circuit as is partly disclosed in Fig. 2, the off-normal relay ON is operated by the marker over a circuit shown diagrammatically and represented by dotted lines on Fig. 2. Relay ON upon operating, prepares the originating register circuit for operation as follows:

(1) Positive battery is applied to the main anodes of the gas tubes and to other various parts of a circuit.

(2) A ground is applied to various parts of the circuit. Relay AS operates at this time.

After seizure by a marker of an idle originating register circuit, as outlined above, the marker effects an interconnection over the cross bar switch train between the seized register and the calling line thereby connecting ring and tip conductors 1 and 2 of the register to the calling subscriber's line. The alternator in series with condenser C1 provides a means of impressing dial tone on transformer T1 and on the subscriber's line. This alternator is shown diagrammatically on Fig. 2. It is to be understood that circuits, not shown, control the alternator so as to provide dial tone to transformer T1 and the called line only at the proper time. Relay L is operated in a circuit extending from a ground on one winding of transformer T1 to conductor 1, through the subscriber's line, back on conductor 2, through another winding of transformer T1, and back to a battery through the L relay winding.

When relay ON operates one of its lower contacts furnishes a negative battery potential through the contacts of relay L unoperated to condenser C2. This causes condenser C2 to assume a charged condition with a negative potential on its left-hand plate and a positive potential on its right-hand plate. When relay L operates the left-hand, or negative plate, of condenser C2 is placed at an effective ground potential through resistor R1, while its right-hand plate now assumes a highly positive potential with respect to ground. This causes a positive current pulse to be generated in transformer T2 which will cause a positive pulse to be applied to the NOR anodes of all the stepping tubes. This causes all stepping tubes to ionize in the normal position. This pulse is generated by transformer T2 and applied to the stepping tubes before relay SR has time to operate.

When the subscriber commences dialing, relay L repeats the dial pulses received over the subscriber's line. A time measuring circuit comprising tube RA and relay RA measures the interdigital time. An 11X circuit, and the P2 tube and P2 relay are provided to register a prefix 11 on the prefix relay 11X and not in the regular digit register tubes. The P2 relay circuit prevents any digit of one pulse from being registered in the A digit register tube. The steering relays AS, CS . . . NS, function so as to apply the pulses of each digit to the appropriate register tube. In the exemplary embodiment shown on Fig. 2 stepping tube $S_1$ will receive and store the pulses of the first digit, stepping tube $S_2$ will receive and store the pulses of the second digit, while stepping tube $S_N$ will receive and store the pulses of the last digit. The dotted lines and connections between stepping tube $S_2$ and stepping tube $S_N$ diagrammatically illustrate the fact that as many stepping tubes as desired for the purpose may be provided. It will only be necessary to provide as many stepping tubes as there will be digits to be stored.

When relay L operates it operates the slow release relay SR, the adjustment of which is such that it will remain operated during the dialing period. The operation of relay L also starts an interdigital timing circuit comprising tube RA, relay RA, register R2, and condenser C3. At this time the RA relay may or may not operate, depending upon the length of time relay L remained operated before dialing was initiated. If the relay is operated for a sufficient time to allow condenser C3 to charge through resistor R2, the winding of relay RA, a positive potential on the contacts of relay ON, to the ionizing potential of tube RA, tube RA will fire and the RA relay will operate. Tube RA is extinguished when the RA relay operates because the locking contact of relay RA puts a negative potential on the main anode of the tube, thereby short-circuiting it. Should relay RA operate at this time no useful function will be performed thereby, and in any event the RA relay will release upon the initiation of dialing.

Tubes RA, P2, OP, 11A and 11B, are common four-element cold cathode tubes. Each has a cathode, a main anode, a start anode, and a keep-alive electrode.

As the subscriber commences dialing, relay L will respond to the pulses sent over the subscriber's line and will repeat them at its contacts. When the first pulse of the first digit is received by relay L it will release and thereby release relay RA by opening its locking circuit. As the L relay releases in response to the first pulse of the first digit a high negative charge will be placed on the left-hand plate of condenser C2. The charging current of condenser C2 will cause transformer T2 to supply a highly negative pulse through the contacts of relay SR operated, and through the contacts of the steering relays, to the B cathode line of stepping tube $S_1$, thereby stepping the discharge path of stepping tube $S_1$ from the NOR position to the B cathode of the first position. The discharge will move to the B cathode of the first position because the potential difference between the main anode and the B cathodes becomes much greater than the potential difference between the main anode and the start cathode. As relay L reoperates at the termination of the first pulse, the discharge of condenser C2 will cause transformer T2 to apply a positive pulse to the B cathode line of stepping tube $S_1$ which will cause the discharge in tube $S_1$ to transfer from the B cathode of the first position to the A cathodes of the first position. The discharge will now transfer from the B cathode to the A cathodes because the potential difference between the main anode and the A cathodes at this time will be greater than the potential difference between the main anode and the B cathodes. The second dial pulse will, in a similar fashion, advance the discharge in stepping tube $S_1$ to position 2. Finally, when the digit is fully counted, the L relay will remain operated, and tube RA will ionize and operate relay RA in the fashion hereinbefore described. As stated before, relay SR is a slow release relay and remains operated during the dialing interval.

If the first digit dialed was an 8, tube $S_1$ will ionize at its No. 8 position and conduction will now be taking place between the main anode of tube $S_1$ and the two A cathodes in position 8. Since the A cathodes in the No. 8 position are connected to cathode leads 1 and 7, conduction will now be taking place over these two leads, thereby raising the potential of these two leads with respect to the other three cathode leads over which conduction is not taking place at this instant.

When the last pulse of the first digit has been received relay RA operates as hereinbefore described. The operation of relay RA causes the steering relay BS to operate, which operation transfers the pulsing path from stepping tube $S_1$ to stepping tube $S_2$ by means of the lower transfer contacts of the BS relay operated. The pulses of the second digit dialed will be applied to stepping tube $S_2$.

Relays RA and AS release on the receipt of the first pulse of the second digit. The pulses representative of the second digit are generated by transformer T2, and detected, counted, and registered in stepping tube $S_2$. When all the pulses of the second digit have been received, those two-out-of-five cathode leads will be rendered conductive which represent the numerical value of the digit now stored in tube $S_2$. When the pulses of the second digit have been received, relay RA reoperates, which in turn causes the operation of the succeeding steering relay. It should be appreciated that there will be as many steering relays and stepping tubes present in the circuit as there are digits to be stored.

As the pulses of succeeding digits are received, they will be detected, counted and stored in additional stepping tubes in a manner similar to that previously described for stepping tubes $S_1$ and $S_2$.

When the pulses of the last digit have been received and stored in stepping tube $S_N$, thus indicating that dialing is completed, other circuits, not shown, operate to send to an idle marker the information represented by the two conducting cathode leads of each stepping tube. Once the marker receives the desired information, it will complete the call and remove ground from the winding of the ON relay, thereby returning all apparatus shown in Fig. 2 to normal.

*Zero operator calls*

The additional cathode in position 0 is to provide an alarm condition whenever stepping tube $S_1$ is stepped to the tenth position by the pulses of the first digit. Such a condition would occur if a subscriber should dial the operator or zero position. When stepping tube $S_1$ ionizes in the tenth position, the potential on the cathode side of resistor R3 rises due to the current flowing through it at this time; this potential increase is transmitted through isolation resistor R4 to the start anode of gas tube OP which now ionizes. Resistor R5 provides current for the peep-alive anode of the tube OP. Tube OP, when ionized, will call in the marker by operating a relay shown diagrammatically on the drawings by dotted lines and designated MST. The operation of relay MST in the marker will effect the necessary circuit connections to call in the operator at this time.

As is seen from Fig. 2 stepping tube $S_1$ is the only circuit which has alarm apparatus in its zero position. Therefore, a zero may be stored in the stepping tube of any other position without calling in any alarm equipment.

*11X calls*

It may be desired that different action should be taken when two one-pulse digits are dialed before another digit. In the telephony art this feature is called a 11X circuit, and it is so designated on Fig. 2. When relay RA operates after a single pulse has been received for the first digit and counted by a stepping tube $S_1$, the potential on the additional cathode in position 1 of the stepping tube increases greatly due to current flow through resistor R13. This increase of potential is applied through the contacts of relay RA operated, through the lower contacts of relay P2 unoperated, to the control anodes of tubes 11A and 11B simultaneously through condensers C4 and C5, respectively. Resistors R6 and R7 are current limiting resistors. Resistors R8 and R9 furnish the necessary "keep-alive voltage" to tubes 11A and 11B, respectively.

Only tube 11A ionizes upon the reception of the first pulse because the pulse applied to the start anode of tube 11B is short-circuited by varistor V1. This pulse is short-circuited because the side of varistor V1 which is connected to the cathode of 11A is at a highly negative potential since tube 11A is nonconducting at this time. The pulse is simultaneously applied to tubes 11A and 11B. Therefore when the first pulse is received simultaneously by both tubes only tube 11A fires because the pulse to tube 11B is short-circuited at this time.

Shortly after the reception of the first pulse relay RA operates as hereinbefore described. Since stepping tube $S_1$ has not stepped to position 2 or beyond, relay P2 will not be operated and therefore will not close or complete the operating circuit for steering relay BS. As relay RA operates, a circuit is completed from battery on the lower contact of relay ON operated, through the upper contact of relay P2 unoperated, through the lower contact of relay RA operated, and through resistors R10 and R11 to the start anodes of the stepping tubes. This completed circuit applies a high positive pulse to the start anode of all the stepping tubes and returns the discharge of any energized tube back to the NOR position.

When the second one-pulse digit is received, relay RA operates again and causes a pulse from position 1 of the stepping tube $S_1$ to be applied to the start anodes of tubes 11A and 11B again. Since tube 11A is already operated, the pulse only affects tube 11B which now operates since varistor V1 now offers a high impedance to the pulse. This high impedance is due to the change in polarity across the varistor as a result of the operation of a tube 11A, which operation causes its cathode potential to increase from a high negative voltage to a high positive voltage.

Tube 11B ionized, operates relay 11X which locks under the control of its off-normal relay ground and performs whatever service functions may be desired for 11X operation.

Each time relay RA operates under the above conditions, no registration is made since a normalizing pulse is applied to the start anode of all the stepping tubes by the contacts of relay P2 unoperated. Also since relay P2 is non-operated, the steering relays do not advance at this time.

*False count of one circuit*

In order that a wrong number will not be registered if the calling subscriber accidentally generates a single pulse by opening the switchhook contact before dialing, the circuit is arranged so that a 1 cannot be registered in the $S_1$ stepping tube. This is accomplished by preventing the operation of P2 relay until at least two pulses have been counted for the first digit. As previously described all stepping tubes will normalize if relay P2 is unoperated when relay RA operates. When the first digit contains two or more pulses, tube P2 and relay P2 operate due to the increased potential now across resistor R12 which causes tube P2 to fire and relay P2 to operate. Relay P2 operating locks to off-normal ground, disables the 11X circuit by opening the pulsing lead to the start anodes of tubes 11A and 11B, and opens the circuit that normalizes the stepping tubes when relay RA operates.

From the foregoing description it can be appreciated that the present invention permits pulses to be detected, counted, and registered, at a faster rate than heretofore known. It is to be understood that the hereinbefore described arrangements are but illustrative of the application of the principles of the invention. Numerous other arrangements may be devised by those skilled in the art without departing from the spirit and scope of the invention.

What is claimed is:

1. In a signaling system, an impulse responsive means responsive to a plurality of series of impulses, a plurality of counting means, means for successively associating each of said counting means with said impulse responsive means, means controlled by said impulse responsive means in response to a series of impulses received to advance the count of the counting means currently associated with said impulse responsive means, means operable upon the cessation of a series of impulses to cause said associating means to disassociate said impulse responsive means and said means controlled thereby from one of said counting means and to associate said impulse responsive means and said means controlled thereby with another of said counting means, means automatically operable for indicating an alarm condition when the number of impulses in the first series of pulses received by said impulse responsive means is equal to or greater than a predetermined number, means operable for indicating an alarm condition when the number of impulses in each of the first two series of impulses received by said impulse responsive means is less than a predetermined number, means operable when a number equal to or greater than a predetermined number is entered into said first counting means, and means automatically operable for resetting said first counting means to its normal position only when the number of impulses in the first series of impulses received is less than a predetermined number.

2. In a signaling system, an impulse responsive means responsive to a plurality of series of impulses, a plurality of tubes, a plurality of distinct conductive positions in each of said tubes, a pair of cathodes at some of said conductive positions, each of said pairs of cathodes being multiplied on a code basis to cathode leads, means for successively associating each of said tubes with said impulse responsive means, means controlled by said impulse responsive means in response to a series of impulses received to advance the conductive position in said tube currently associated with said impulse responsive means step by step from position to position, means operable upon the cessation of a series of impulses to cause said associating means to disassociate said impulse responsive means and said means controlled thereby from one of said tubes and to associate said impulse responsive means and said means controlled thereby with another of said tubes whereby upon the termination of a plurality of series of impulses the conductive condition of the cathode leads of the operated tubes is indicative of the currently conducting conductive position in each of said tubes, means operable for indicating an alarm condition when the number of impulses applied to said impulse responsive means during the reception of the first series of impulses is equal to or greater than a predetermined number and means automatically operable for indicating a different alarm condition only when each of the first two series of impulses received by said impulse responsive means does not contain a number of pulses greater than a predetermined minimum number.

3. In a signaling system, an impulse responsive means responsive to a plurality of series of impulses, a plurality of tubes, a plurality of distinct conductive positions in each of said tubes, a pair of cathodes at some of said conductive positions, each of said pairs of cathodes being multiplied on a code basis to cathode leads, means for successively associationg each of said tubes with said impulse responsive means, means controlled by said impulse responsive means in response to a series of impulses received to advance the conductive position in said tube currently associated with said impulse responsive means step by step from position to position, means operable upon the cessation of a series of impulses to cause said associating means to disassociate said impulse responsive means and said means controlled thereby from one of said tubes and to associate said impulse responsive means and said means controlled thereby with another of said tubes whereby upon the termination of a plurality of series of impulses the conductive condition of the cathode leads of the operated tubes is indicative of the currently conducting conductive position in each of said tubes, means automatically operable for restoring the conductive position of the first tube to normal only when the number of impulses in the first series of impulses received is not equal to or greater than a predetermined minimum number, and means operable to prevent any further operation of said associating means when the number of impulses in the first series of impulses received is not equal to or greater than a predetermined number.

4. In a signaling system, an impulse responsive means responsive to a plurality of series of impulses, a plurality of tubes, a plurality of distinct conductive positions in each of said tubes, a pair of cathodes at some of said conductive positions, each of said pairs of cathodes being multiplied on a code basis to cathode leads, means for successively associating each of said tubes with said impulse responsive means, means controlled by said impulse responsive means in response to a series of impulses received to advance the conductive position in said tube currently associated with said impulse responsive means step by step from position to position, means operable upon the cessation of a series of impulses to cause said associating means to disassociate said impulse responsive means and said means controlled thereby from one of said tubes and to associate said impulse responsive means and said means controlled thereby with another of said tubes whereby upon the termination of a plurality of series of impulses the conductive condition of the cathode leads of the operated tubes is indicative of the currently conducting conductive position in each of said tubes, means operable for indicating an alarm condition when the number of impulses in the first series of impulses received by said impulse responsive means is equal to or greater than a predetermined number, means operable for indicating a different alarm condition when each of the first two series of impulses received by said impulse responsive means does not contain a quantity of pulses greater than a predetermined number, means automatically operable for restoring the conductive position of the first tube to normal only when the number of impulses in the first series of impulses received is not equal to or greater than a predetermined number, and means operable to prevent any further operation of said associating means if the number of impulses in the first series of impulses received by said impulse responsive means is not equal to or greater than a predetermined number.

5. In a signaling system, an impulse responsive means responsive to a plurality of series of impulses, a plurality of tubes, a plurality of distinct conductive positions in each of said tubes, a pair of cathodes at some of said conductive positions, each of said pairs of cathodes being multiplied on a code basis to cathode leads, means for successively associating each of said tubes with said impulse responsive means, means controlled by said impulse responsive means in response to a series of impulses received to advance the conductive position in said tube currently associated with said impulse responsive means step by step from position to position, means operable upon the cessation of a series of impulses to cause said associating means to disassociate said impulse responsive means and said means controlled thereby from one of said tubes and to associate said impulse responsive means and said means controlled thereby with another of said tubes whereby upon the termination of a plurality of series of impulses the conductive condition of the cathode leads of the operated tubes is indicative of the currently conducting conductive position in each of said tubes, means automatically operable for indicating an alarm condition when the number of impulses in the first series of impulses received by said impulse responsive means is equal to or greater than a predetermined number.

6. In a signaling system, an impulse responsive means responsive to a plurality of series of impulses, a plurality of tubes, a plurality of distinct conductive positions in each of said tubes, a pair of cathodes at some of said conductive positions, each of said pairs of cathodes being multiplied on a code basis to cathode leads, means for successively associating each of said tubes with said impulse responsive means, means controlled by said impulse responsive means in response to a series of impulses received to advance the conductive position in said tube currently associated with said impulse responsive means step by step from position to position, means operable upon the cessation of a series of impulses to cause said associating means to disassociate said impulse responsive means and said means controlled thereby from one of said tubes and to associate said impulse responsive means and said means controlled thereby with another of said tubes whereby upon the termination of a plurality of series of impulses the conductive condition of the cathode leads of the operated tubes is indicative of the currently conducting conductive position in each of said tubes, means automatically operable for indicating an alarm condition when each of the first two series of impulses received by said impulse responsive means does not contain a quantity of pulses greater than a predetermined minimum number.

7. In a signaling system, an impulse responsive means responsive to a plurality of series of impulses, a plurality of tubes, a plurality of distinct conductive positions in each of said tubes, a pair of cathodes at some of said conductive positions, each of said pairs of cathodes being multiplied on a code basis to cathode leads, means for successively associating each of said tubes with said impulse responsive means, means controlled by said impulse responsive means in response to a series of impulses received to advance the conductive position in said tube currently associated with said impulse responsive means step by step from position to position, means operable upon the cessation of a series of impulses to cause said associating means to disassociate said impulse responsive means and said means controlled thereby from one of said tubes and to associate said impulse responsive means and said means controlled thereby with another of said tubes whereby upon the termination of a plurality of series of impulses the conductive condition of the cathode leads of the operated tubes is indicative of the currently conducting conductive position in each of said tubes, means operable whereby the conductive position of the first tube is restored to normal when the number of impulses in the first series of impulses received is not equal to or greater than a predetermined minimum number.

8. In a signaling system, an impulse responsive means responsive to a plurality of series of impulses, a plurality of tubes, a plurality of distinct conductive positions in each of said tubes, a pair of cathodes at some of said conductive positions, each of said pairs of cathodes being multiplied on a code basis to cathode leads, means for successively associating each of said tubes with said impulse responsive means, means controlled by said impulse responsive means in response to a series of impulses received to advance the conductive position in said tube currently associated with said impulse responsive means step by step from position to position, means operable upon the cessation of a series of impulses to cause said associating means to disassociate said impulse responsive means and said means controlled thereby from one of said tubes and to associate said impulse responsive means and said means controlled thereby with another of said tubes whereby upon the termination of a plurality of series of impulses the conductive condition of the cathode leads of the operated tubes is indicative of the currently conducting conductive position in each of said tubes, means automatically operable to prevent any further operation of said associating means when the number of impulses in the first series of impulses received is not equal to or greater than a predetermined number.

9. In a signaling system an impulse responsive relay, responsive to a series of impulses, a plurality of cold cathode stepping tubes each having eleven conductive positions therein, a pair of cathodes at all but one of said conductive positions, an additional cathode at some of said conductive positions, each of said pairs of cathodes being connected on a code basis to five leads so as to form a two out of five code, relay circuit means for successively associating each of said cold cathode tubes with said impulse responsive relay, means including relay contacts controlled by said impulse responsive relay in response to the reception of a series of impulses to apply pulses to and thereby advance the conductive position in said stepping tube currently associated with said relay responsive means step by step from conductive position to conductive position with said tube, relay circuit means operable upon the cessation of a series of impulses received by said impulse responsive relay to cause said associating means to disassociate said impulse responsive relay and said contacts controlled thereby from one of said stepping tubes and to associate said impulse responsive relay and said contacts controlled thereby with another of said stepping tubes whereby upon termination of a plurality of a series of impulses the conductive condition of the five leads of each of the operated stepping tubes is indicative of the currently conducting conductive position in each of said stepping tubes, means including one of said additional cathodes at a conductive position and an additional circuit means for indicating an alarm condition when the number of impulses in the first series of impulses received is equal to or greater than a predetermined number, means including one of said additional cathodes at another of said conductive positions and additional circuit means for indicating an alarm condition when each of the first two series of impulses received does not contain a quantity of impulses greater than a predetermined number, means including said last-named additional cathode and additional circuit means automatically operable for restoring the conductive position of the first stepping tube to normal when the number of impulses in the first series of impulses received is not equal to or greater than a predetermined number, means including said last-named additional cathode means and relay circuits to prevent any further operation of said associating means when the number of impulses in the first series of impulses received is not equal to or greater than a predetermined number.

References Cited in the file of this patent

UNITED STATES PATENTS

| | | |
|---|---|---|
| 1,498,544 | Fowler | June 24, 1924 |
| 2,451,319 | Candy et al. | Oct. 12, 1948 |
| 2,484,226 | Holden | Oct. 11, 1949 |
| 2,550,600 | Rehm | Apr. 24, 1951 |
| 2,597,428 | Bachelet | May 20, 1952 |
| 2,619,528 | Vroom | Nov. 25, 1952 |
| 2,623,108 | Holden | Dec. 23, 1952 |

FOREIGN PATENTS

| | | |
|---|---|---|
| 134,125 | Sweden | Oct. 4, 1951 |